(12) United States Patent
Campbell et al.

(10) Patent No.: US 6,270,548 B1
(45) Date of Patent: Aug. 7, 2001

(54) SINTERING PROCESS FOR DIAMOND AND DIAMOND GROWTH

(76) Inventors: James Wilbert Campbell, 91 East Avenue, Athol, Johannesburg, 2001; Moosa Mahomed Adia, 8 Nagel Street, Lakefield, Benoni, 1501; Geoffrey John Davies, 36 Boundary Road, Linden Extension, Randburg, 2194; Raymond Albert Chapman, 183 Columbine Avenue, Mondeor; Klaus Tank, 9 Warbleton Avenue, Essexwold, Johannesburg, 2001; Aulette Stewart, 22 Nicolyn Avenue, Ruiterhof, Randburg, 2194; Lesley Kay Hedges, 4 Oriole Mews, Delphinium Street, Brackenhurst, 1448, all of (ZA)

( * ) Notice: Subject to any disclaimer, the term of this patent is extended or adjusted under 35 U.S.C. 154(b) by 0 days.

(21) Appl. No.: 09/403,009

(22) PCT Filed: Apr. 16, 1998

(86) PCT No.: PCT/GB98/01115

§ 371 Date: Nov. 23, 1999

§ 102(e) Date: Nov. 23, 1999

(87) PCT Pub. No.: WO98/46344

PCT Pub. Date: Oct. 22, 1998

(30) Foreign Application Priority Data

Apr. 17, 1997 (ZA) .................................................. 97/3283
Apr. 17, 1997 (ZA) .................................................. 97/3284

(51) Int. Cl.$^7$ .................................................. C22C 26/00
(52) U.S. Cl. ................................ 75/243; 423/446; 117/79; 428/408
(58) Field of Search ............................... 75/243; 423/446; 117/79; 428/408

(56) References Cited

U.S. PATENT DOCUMENTS

| 4,505,746 | 3/1985 | Nakai et al. ............................ 75/243 |
| 5,503,104 | 4/1996 | Spiro ..................................... 117/79 |
| 5,772,756 | * 6/1998 | Davies .................................. 117/79 |

FOREIGN PATENT DOCUMENTS

| 0 699 642 | 3/1996 | (EP) . |
| 0 779 129 | 6/1997 | (EP) . |
| 2 256 900 | 8/1975 | (FR) . |
| 2 512 430 | 3/1983 | (FR) . |
| 1 541 847 | 3/1979 | (GB) . |
| 2 239 011 | 6/1991 | (GB) . |

* cited by examiner

Primary Examiner—Ngoclan Mai
(74) Attorney, Agent, or Firm—Oblon, Spivak, McClelland, Maier & Neustadt, P.C.

(57) ABSTRACT

A method of making a bonded, coherent material comprising a mass of diamond crystals in a matrix, which optionally contains another phase. The method includes the steps of providing a source of diamond crystals, providing a plurality of diamond centers defined by diamond crystals, producing a reaction mass by bringing the source and growth centers into contact with a solvent/catalyst, subjecting the reaction mass to conditions of elevated temperature and pressure suitable for crystal growth in the reaction zone of a high temperature/high pressure apparatus to produce the material, and removing the material from the reaction zone. The method is characterized by providing the necessary supersaturation of carbon in the solvent/catalyst, at least in part and preferably predominantly, by a selection of particle size difference between the source crystal and the growth centers. The mass of diamond crystals in the matrix of the bonded, coherent material of the invention has a high concentration of twinned diamonds.

27 Claims, 6 Drawing Sheets

{111} TWIN PLANES {111}

STAR TWIN

{111} TWIN PLANES
{111}

STAR TWIN

STAR TWIN

{111} TWIN PLANE

CUBE CONTACT-TWINNED ALONG A {111} PLANE

{111} TWIN PLANE   {111} TWIN PLANE   {111} TWIN PLANE   {111} TWIN PLANE

STAR TWIN

POLYSYNTHETIC TWIN

STAR TWIN
AGGREGATE OF TWINNED CRYSTALS

SYNTHETIC MACLE TWINS - PLATES

SYNTHETIC MACLE TWINS - PLATES

ELONGATE STAR TWINS

SINTERING PROCESS FOR DIAMOND AND DIAMOND GROWTH

BACKGROUND OF THE INVENTION

This invention relates to a diamond crystal containing material useful, for example, as a tool component or insert.

The manufacture of diamond matrix composites or tool materials or components, such as saw segments, grinding wheels and polycrystalline diamond (PCD) products, is well established. There are various methods used in their manufacture. For saw segments, pellets, pearls, and the like, diamond powder is mixed with matrix material and the mixture sintered, substantially at atmospheric pressure, to produce the component. Alternatively, the molten matrix material is infiltrated into a bed of the diamond powder, also substantially at atmospheric pressure, to produce the component. For PCD products, diamond powder is sintered under conditions of high temperature and high pressure in the presence of a solvent-catalyst, and the resultant piece shaped afterwards to produce the final component.

In essence, each method and product starts with diamond powder and then the component is fabricated. Some of these methods are conducted at substantially atmospheric pressure, and components produced by them, are restricted to matrices that sinter or infiltrate at relatively low temperature so that graphitisation of the diamond is avoided or minimised.

In the manufacture of PCD products, the solvent-catalyst is restricted usually to the matrices used for the production of the cemented tungsten carbide support, or in the case of the more thermally stable products, the infiltrant is restricted to those elements or compounds which react with the diamond to form a desirable phase, e.g. silicon forming silicon carbide.

SUMMARY OF THE INVENTION

According to the present invention, a method of making a bonded, coherent material comprising a mass of diamond crystals in a matrix, optionally containing another phase, includes the steps of providing a source of diamond crystals, providing a plurality of growth centres defined by diamond crystals, the quantity of source crystals generally being greater than that of the growth centres, producing a reaction mass by bringing the source and growth centres into contact with a solvent/catalyst and the other phase, when used, subjecting the reaction mass to conditions of elevated temperature and pressure suitable for crystal growth in the reaction zone of a high temperature/high pressure apparatus to produce the material and removing the material from the reaction zone, the necessary supersaturation of carbon in the solvent/catalyst being achieved, at least in part, and preferably predominantly, by a selection of particle size difference between the source crystal and the growth centres.

The bonded, coherent material made by the method of the invention has been found to contain a mass of diamond crystals in which at least 40 percent, typically at least 80 percent, and generally substantially the entire mass, consists of synthetic twinned diamonds. The twinned diamond include contact twins, macle twins, including multiple and single macle twins, polysynthetic twins and star twins, i.e. a multiple twin in which at least some of the twin planes are not parallel. Various shapes of twin diamonds are also to be found. These shapes include blocky or cube shape, plate shape and column shape. For the plate and column shaped diamonds, the crystals have a high aspect ratio, i.e. a high ratio of longest dimension to shortest dimension. A bonded, coherent material of this type is believed to be new and forms another aspect of the invention.

The bonded, coherent material of the invention may, for example, be used as a tool component, blank or insert, bearing surface, substrate for further processing, abrasive material, heat sink, biomedical material, catalyst body or the like. These materials in their application all use the properties of diamond, the matrix or a combination of the properties of diamond and matrix.

The material may have zones of different properties. For example, the zones may vary in crystal concentration or size, in matrix, in nature of the other phase, or in a combination thereof. The differing zones may extend in layers or regions which are distributed in a random or ordered way, for example, from one side of the material to an opposite side or may extend in layers from a central point to an outside surface of the material.

The invention has particular application to materials which have a diamond content of less than 80 percent by volume.

The material may be produced in such manner as to provide it with a substrate to which it is bonded. The nature of the substrate may be chosen to complement the properties of the material.

BRIEF DESCRIPTION OF THE PHOTOGRAPHS

The photographs which form FIGS. 1 to 10 show examples of twinned diamond crystals present in a diamond crystal containing material made by the method of the invention.

DESCRIPTION OF EMBODIMENTS

The invention allows for the manufacture of a tool component or material by preshaping a mass of source crystals, growth centres and matrix material and causing the growth centres to grow and the matrix to form in the same operation. This allows, for example, for the manufacture of a tool component or material to near net shape and dimension for end use. The nature of the matrix determines the service conditions which the tool component or material can endure. The supersaturation-time profile determines the growth rate and size of the diamond and the relative amounts of the crystal source growth centres and matrix in the preshaped mass determine the crystal concentration in the tool component or material.

The preshaping or preparation of the crystals and matrix can be done by any conventional method, e.g. hot pressing, cold compaction with and without a temporary binder, or slip casting. The chosen conditions for preshaping or preparation are preferably such that the diamond is not substantially graphitised.

In the method of the invention, the growth of crystals is achieved, at least in part, by supersaturation created by a difference in particle size between the source crystals and the growth centres. The source crystals and growth centres may be provided by particles at opposite ends of a particle size range. Thus, in this case, the growth centres will be provided by crystals at the higher end of the particle size range, whilst the source crystals will be provided by crystals at the lower end of the particle size range. The quantity of crystals, i.e. number of crystals, at the lower end of the range will generally be much greater than that at the higher end of the range.

The source crystals will be smaller than the growth centres. The size of the source crystals will thus depend on the size of the growth centres. It has been found that particularly good diamond growth and a particularly effective bonded, coherent material can be produced if the source crystals have a size of less than 20 microns, and generally less than 15 microns.

The growth centres may also be provided by seed crystals which are separate and distinct from the source crystals. Such seed crystals will generally be substantially larger than the source crystals. An example of this form of the invention is using particles of a size less than 10 microns as source crystal particles, and seed crystals having a size substantially greater than 10 microns, e.g. at least 40 microns, as growth centres. The quantity of seed crystals will generally be much greater than that of the source crystals.

Examples of suitable solvent/catalysts are transition metal such as iron, cobalt, nickel, manganese and alloys containing any one of these metals, stainless steels superalloys (e.g. cobalt, nickel and iron-based), bronzes including cobalt-containins bronzes and brazes such as nickel/phosphorus, nickel/chromium/phosphorus and nickel/palladium. Other suitable solvent/catalysts for diamond are elements, compounds and alloys not containing transition metals, e.g. copper, copper/aluminium and phosphorus, and non-metallic materials or a mixture thereof such as alkaline, alkaline earth metal hydroxides, carbonates and sulphates.

The source particles may be synthetic diamond, including polycrystalline diamond, produced by conventional high pressure/high temperature processes. The source particles may also be natural diamond (including carbonado), shock-wave diamond or CVD diamond, i.e. diamond produced by chemical vapour deposition. The growth centre diamonds may be of a similar type, except they will, of course, always be larger in size than the source diamonds.

The seed crystals may have well-developed facets and be devoid of twin planes, e.g. cubes, octahedra and cubo-octahedra, or they may contain twin planes, or they may be irregular, rounded or spheroidal. The seed crystals may be coated or clad, e.g. with solvent/catalyst.

The conditions of elevated temperature and pressure which are used in the method are known in the art. The synthesis conditions may be those under which diamond is thermodynamically stable. These conditions are well known in the art. Generally, the elevated temperature will be in the range 1200 to 1500° C. and the elevated pressure will be in the range 50 to 70 kilobars (5 to 7 GPa). These elevated temperature and pressure conditions will be maintained for a period sufficient to allow the crystal growth to occur. The time will generally be greater than 15 minutes and can be up to one hour or longer.

It is also possible to produce diamond growth under conditions which are outside the region of thermodynamic stability of diamond. Conditions of temperature and pressure outside the region of thermodynamic stability of diamond can be used if the Ostwald rule dominates the growth process rather than the Ostwald-Volmer rule (see Bohr, R Haubner and B Lux Diamond and Related Materials volume 4, pages 714–719, 1995)—"According to the Ostwald rule, if energy is withdrawn from a system with several energy states, the system will not reach the stable ground state directly, but instead will gradually pass through all intermediate states. In addition, according to the Ostwald-Volmer rule, the less dense phase is formed (nucleated) first. Where the two rules would appear to contradict each other, the Ostwald-Volmer rule has priority over the Ostwald rule." In the case of diamond crystal growth outside its region of thermodynamic stability, the Ostwald-Volmer rule can be suppressed by, for example, the application of pressure, thus allowing the growth of diamond on pre-existing diamond particles provided graphite crystals are substantially absent. Although isothermal and isobaric conditions are not essential to the practice of this invention, such conditions are preferred as then the method can be more easily controlled.

The source crystals and the growth centre crystals are brought into contact with a suitable solvent/catalyst to create a reaction mass. Generally, the crystals will be mixed with the solvent/catalyst in particulate form. There must be sufficient source crystal to create supersaturation of carbon in the solvent/catalyst. Solution of the source crystal in the solvent/catalyst may be in solid or liquid state. The content of source and growth centre diamond, together in the reaction mass will generally be at least 10% by volume and generally less than 80% by volume. A typical content of source and growth centre diamond is 30% by volume.

The reaction mass may be placed in the reaction zone of a conventional high temperature/high pressure apparatus and the contents then subjected to the desired elevated conditions of temperature and pressure. The source material dissolves preferentially with respect to the coarser growth centre crystals in the catalyst/solvent. The carbon solute migrates to the growth centres and precipitates or grows thereon. The crystals which are produced will have a morphology which is dependent on the saturation-time profile utilised, apart from the temperature and pressure conditions and chemical composition of the solvent/catalyst which also influence morphology.

The matrix of the diamond crystal-containing material of the invention may contain another phase, or third phase. The other phase should be thermodynamically stable under the conditions of manufacture of the product and may be insoluble, or substantially insoluble, in the solvent/catalyst under these conditions. When the other phase material is soluble, or substantially soluble in the solvent/catalyst, it may be protected by a coating or cladding of lesser solubility.

The other phase and the nature thereof, will depend on the type of product to be produced. The other phase may take the form of particles, fibres, whiskers, platelets or the like. Examples of suitable third phase materials are carbides, oxides, sulphides, nitrides, silicides, borides, elemental materials or a mixture thereof or bonded materials such as cemented carbides. Specific examples of suitable third phase materials are tungsten carbide, cemented tungsten carbide particles, titanium carbide, aluminium oxide, titanium nitride, silicon nitride, silicon carbide, aluminium nitride, cubic boron nitride and the like.

The other phase may also be or contain a lubricant such as graphite, hexagonal boron nitride or molybdenum disulphide. With the inclusion of such lubricants in the material, the use of external lubricants may be avoided.

The other phase, when in particulate form, may have a particle size which is the same as, or differs from, that of the crystals of the material.

The other phase may contain more than one component, e.g. contain both a carbide and a nitride, or it may include a number of different phases.

The other phase will generally be mixed with the solvent/catalyst and the diamond source and growth centre material to produce a reaction mass. The reaction mass is then subjected to the elevated temperature and pressure conditions described above.

The other phase may also be made in situ in the reaction mass during the diamond growth.

The microstructure of the matrix can be manipulated in a number of ways such as by control of the cooling stage from the high temperature/pressure step, by subsequent heat treatment or by the inclusion of grain refining materials in the reaction mass.

As mentioned above, the diamond crystals present in the bonded, coherent material contain a high percentage of synthetic twinned diamonds. Examples of the twinned diamond crystals present in the material are illustrated by photographs 1 to 10. FIGS. 1 to 7 are scanning electron micrographs and FIGS. 8 to 10 optical photographs, taken at between 30 and 150 times magnification.

FIGS. 2, 3, 4 and 6 are photographs of star twin diamond crystals from different angles. Star twinning is a form of cyclic twinning involving non-parallel {111} twin planes. Some of the {111} twin planes are identified in FIGS. 2, 3 and 6.

FIG. 5 illustrates a cube crystal contact-twinned along a {111} plane. The corner at the top of the photograph is that of a cube—the three edges meeting at the point are mutually perpendicular. The {111} twin plane is identified.

FIG. 7 shows an aggregate of three intergrown twinned crystals. Two crystals (one almost vertical and the largest—almost horizontal) display polysynthetic twinning which involves a series of parallel composition planes. The crystal directed towards the viewer displays star twinning. Viewed end on, the crystal appears like a five sided star.

Figure 1:
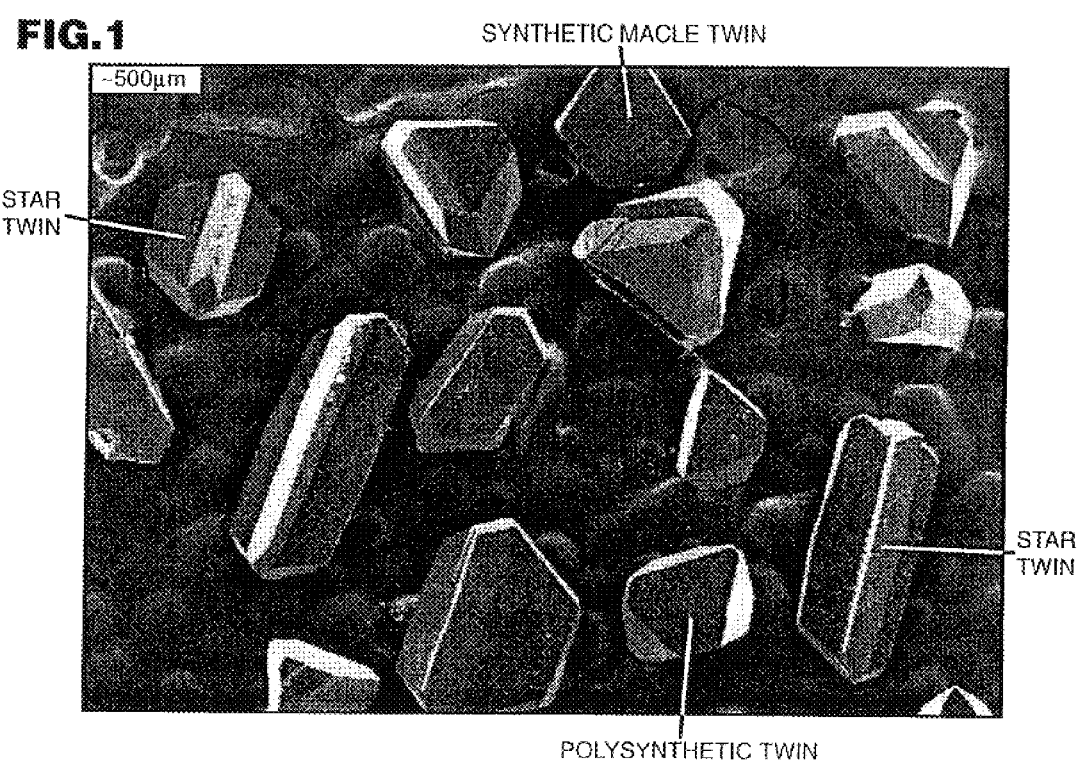

The invention will now be illustrated by the following examples.

EXAMPLE 1

A reaction capsule was used to produce a material comprising diamond crystals dispersed in an iron-cobalt matrix. A mixture was made of (a) 50 g diamond powder, with a maximum size of 8 microns and 50% by mass less than 1 micron, and (b) 285 g cobalt iron (65Co.35Fe) catalyst/solvent. The diamond was produced by crushing coarser synthetic material. The mixture was shaped into a cylinder, containing about 25% porosity, by hot pressing. The cylinder was placed in the reaction capsule and raised to conditions of about 55 kilobars and about 1380° C. The piece that was removed from the capsule was cylindrical in shape and the dimensions had been reduced in proportion to the reduction in porosity. Inside, the diamond material had grown to a size greater than 70 US mesh (210 microns) and was substantially all synthetic twinned diamond. The material which was bonded and coherent had a strength and abrasion resistance suitable for use in wear resistance and cutting applications.

EXAMPLE 2

A reaction capsule was used to produce a material comprising diamond crystals and tungsten carbide grains dispersed in an iron-cobalt matrix. A mixture was made of (a) 0.01 g diamond seeds, about 75 microns in size, (b) 42 g diamond powder, less than 0.5 micron in size, (c) 118 g eutectic tungsten carbide grains, between 40 and 60 US mesh (250 to 420 microns) in size, and (d) 240 g cobalt iron (65Co.35Fe) matrix powder. The diamond was produced by crushing coarser synthetic material. The mixture was shaped into a cylinder by hot pressing at 750° C. for 15 minutes. The cylinder, containing about 25% porosity, was placed in the reaction capsule and raised to conditions of about 55 kilobars and 1380° C. After removal from the capsule, the piece was cylindrical in shape, and the dimensions had been reduced in proportion to the reduction in porosity. Fracturing the piece revealed that the diamond source material had grown to a size greater than 70 US mesh (210 microns) and was substantially all synthetic twinned diamond. The tungsten carbide grains had remained at their original size. Furthermore, the diamond crystals and the tungsten carbide grains were well dispersed in the matrix. The material which was bonded and coherent had a strength and abrasion resistance suitable for use in wear resistance and cutting applications.

Similar twinned diamond-crystal containing materials produced by the Examples 1 and 2 were made using the method of the invention and different matrices. These Examples (3 to 18), and the conditions used, are set out in the table hereinafter.

| Example | Matrix | Pressure (kbar) | Temperature (° C.) | Time (mins) | Source Size range (microns) | Seed size (microns) | Result Size ($\mu$m) |
|---|---|---|---|---|---|---|---|
| 3 | 100% Co | 53.0 | 1400 | 660 | 0–0.5 | none | 150–600 |
| 4 | 100% Ni | 54.8 | 1410 | 660 | 0–0.5 | none | 200–1000 |
| 5 | 65Co.35Fe | 55.0 | 1380 | 1320 | 0–0.5 | 75 | 70–600 |
| 6 | 65Co.35Fe | 53.0 | 1370 | 1020 | 0–0.5 | 65–75 | 150–300 |
| 7 | 70Fe.30Ni | 55.0 | 1430 | 600 | 6–12 | none | 10–20 |
| 8 | 70Fe.30Ni | 54.2 | 1250 | 60 | 0–0.5 | none | 50–150 |
| 9 | 52Mn.48Ni | 54.2 | 1410 | 660 | 0–0.5 | 49–65 | 80–200 |
| 10 | 56Cu.30Co.14Sn | 54.2 | 1410 | 40 | 0–0.5 | 49–65 | 200–700 |
| 11 | 60Co.32Cu.8Sn | 54.2 | 1410 | 660 | 0–0.5 | 49–65 | 200–700 |
| 12 | 40Cu.26Mn.24Ni.10Sn | 54.2 | 1410 | 40 | 0–0.5 | 49–65 | 150–350 |
| 13 | 68Cu.17Sn.15Co | 54.2 | 1410 | 660 | 0–0.5 | 49–65 | up to 60 |
| 14 | 100% Cu | 54.2 | 1420 | 660 | 0–0.5 | none | up to 30 |
| 15 | 89Ni.LIP | 54.2 | 1250 | 660 | 0–0.5 | none | 50–250 |
| 16 | 77Ni.13Cr.10P | 54.2 | 1410 | 660 | 0–0.5 | none | 100–750 |
| 17 | 80Cu.20Sn | 55.0 | 1460 | 660 | 0–0.5 | nane | up to 30 |
| 18 | 60Cu.40Sn | 55.0 | 1460 | 660 | 0–0.5 | none | up to 30 |

Examples of twinned diamond-crystal containing materials produced by the method of the invention, but using different source sizes and diamond types, are set out in Examples 19 to 26. In these examples and in examples 27 to 54, an iron nickel or cobalt iron catalyst/solvent was used.

| Example | Source size (microns) | Source type | Pressure (kbar) | Temperature (° C.) | Time (mins) | Result Size (μm) |
|---|---|---|---|---|---|---|
| 19 | 0–0.5 | synthetic | 54.2 | 1220 | 60 | 50–150 |
| 20 | 0.5–1.0 | synthetic | 54.2 | 1220 | 60 | up to 30 |
| 21 | 1.0–2.0 | synthetic | 54.5 | 1330 | 600 | 20–60 |
| 22 | 3–6 | synthetic | 54.5 | 1330 | 600 | 10–20 |
| 23 | 6–12 | svntheic | 55.0 | 1430 | 600 | 10–20 |
| 24 | 8–16 | synthetic | 56.0 | 1460 | 600 | 200–400 |
| 25 | 0.04 | shock wave | 54.5 | 1380 | 660 | up to 80 |
| 26 | 0–0.5 | natural | 54.5 | 1380 | 660 | 200–400 |

As pointed out above, the matrix of the diamond-crystal containing material may contain another or third phase material. Various third phase materials, in various forms, may be used to produce twinned diamond-crystal containing materials of the invention. The conditions and materials used in these examples, namely, Examples 27 to 29, are set out hereinafter.

| Example | 27 | 28 | 29 |
|---|---|---|---|
| Diamond source type | natural | synthetic | synthetic |
| Source size (μm) | 0.5–1.0 | 1.0–2.0 | 1.0–2.0 |
| Seed type | none | synthetic diamond | synthetic diamond |
| Seed size (μm) |  | 67–75 | 65–75 |
| Pressure (kbar) | 54.2 | 55.2 | 55.2 |
| Temperature (° C.) | 1390 | 1370 | 1370 |
| Time (mins) | 180 | 600 | 600 |
| Third phase | WC-Co (7,37%) | SiC | SiC |
| Shape of third phase | rounded | platelets | whiskers |
| Result | tungsten carbide-cobalt stable, diamond crystals twinned, size 20–40 μm | silicon carbide platelets stable, diamond crystals twinned, size 10–20 μm | silicon carbide whiskers stable diamond crystals twinned, size 15–60 μm |

A particularly useful third phase material has been found to be a carbide. Various carbides have been used in producing twinned diamond crystal containing materials and the conditions used are set out hereinafter (Examples 30 to 35). In each of these examples the carbide remained stable in the material produced.

| Example | 30 | 31 | 32 | 33 | 34 | 35 |
|---|---|---|---|---|---|---|
| Source type | synthetic diamond | synthetic diamond | synthetic diamond | natural diamond | synthetic diamond | synthetic diamond |
| Source size (μm) | 0–0.5 | 0.5–1.0 | 0–0.5 | 0–0.5 | 1.0–2.0 | 1.0–2.0 |
| Seed type | synthetic diamond | none | none | none | synthetic diamond | synthetic diamond |
| Seed size (μm) | 65–75 |  |  |  | 65–75 | 65–75 |
| Pressure (kbar) | 53.0 | 54.2 | 54.2 | 54.2 | 55.2 | 55.2 |
| Temperature (° C.) | 1370 | 1390 | 1390 | 1390 | 1370 | 1370 |
| Time (mins) | 660 | 180 | 180 | 180 | 600 | 600 |
| Third phase | eutectic WC/W$_2$C | WC–Co | WC | WC | Cr$_3$C$_2$ | SiC |
| Size of third phase (μm) | 250–420 | 210–297 | 38–88 | 38–88 | less than 45 | 105–125 |
| Result Size (μm) | 200–400 | up to 15 | up to 20 | 30–60 | 30–60 | 10–20 |

Other useful third phase materials are nitrides and oxides. Examples of the use of such third phase materials and the conditions used are set out hereinafter in Examples 36 to 41. In each of these examples, the diamond in the material was twinned and the nitride or oxide remained stable.

| Example | 36 | 37 | 38 | 39 |
|---|---|---|---|---|
| Diamond source type | synthetic | synthetic | synthetic | synthetic |
| Source size (μm) | 1.0–2.0 | 0.5–1.0 | 1.0–2.0 | 1.0–2.0 |
| Seed type | synthetic diamond | none | synthetic diamond | synthetic diamond |
| Seed size (μm) | 65–75 | | 67–75 | 67–75 |
| Pressure (kbar) | 55.2 | 55.2 | 55.2 | 55.2 |
| Temperature (° C.) | 1370 | 1420 | 1370 | 1370 |
| Time (mins) | 600 | 600 | 600 | 600 |
| Third phase | $Si_3N_2$ | cubic BN | AlN | TiN |
| Size of third phase in material (μm) | less than 10 | 88–105 | less than 125 | less than 45 |
| Result Size (μm) | up to 150 | 10–20 | 10–20 | 10–30 |

| Example | 40 | 41 |
|---|---|---|
| Diamond source type | synthetic | synthetic |
| Source size (μm) | 1.0–2.0 | 0.5–1.0 |
| Seed type | synthetic diamond | none |
| Seed size (μm) | 65–75 | |
| Pressure (kbar) | 55.2 | 55.2 |
| Temperature (° C.) | 1370 | 1420 |
| Time (mins) | 600 | 600 |
| Third phase | $Al_2O_3$ | lime stabilised zirconium dioxide |
| Size of third phase in material (μm) | about 100 | less than 45 |
| Result - Size (μm) | 10–30 | 10–20 |

Examples 42 to 46 illustrate methods of making twinned diamond crystal-containing materials using carbides and nitrides as a third phase and various sizes of diamond and third phase. The third phase material remained stable in the material produced.

| Example | 42 | 43 | 44 | 45 | 46 |
|---|---|---|---|---|---|
| Diamond source type | synthetic | synthetic | natural | natural | synthetic |
| Source size (μm) | 0.5–1.0 | 0–0.5 | 0–0.5 | 0–0.5 | 1.0–2.0 |
| Seed type | none | none | none | none | synthetic diamond |
| Seed size (μm) | | | | | 65–75 |
| Pressure (kbar) | 54.2 | 54.2 | 54.2 | 54.2 | 55.2 |
| Temperature (° C.) | 1390 | 1390 | 1390 | 1390 | 1370 |
| Time (mins) | 180 | 180 | 180 | 180 | 600 |
| Third phase | tungsten carbide with 7.37% cobalt | tungsten carbide | tungsten carbide with 7.37% cobalt | tungsten carbide | silicon nitride |
| Size of third phase in material (μm) | 210–297 | 38–88 | 210–297 | 38–88 | less than 10 |
| Result - Size (μm) | up to 20 | up to 20 | 30–60 | 30–60 | up to 150 |

Examples using different concentrations of diamond and third phase in a twinned diamond crystal-containing material of the invention are shown in Examples 47 to 54. The third phase remained stable in the materials of each of these examples.

| Example | 47 | 48 | 49 | 50 |
|---|---|---|---|---|
| Diamond source type | synthetic | synthetic | synthetic | synthetic |
| Source size (μm) | 0–0.5 | 0–0.5 | 8–16 | 1.5–3.0 |
| Seed type | none | none | none | none |
| Seed size (μm) | | | | |
| Pressure (kbar) | 53.0 | 55.0 | 56.0 | 54.2 |
| Temperature (° C.) | 1370 | 1450 | 1460 | 1390 |
| Time (mins) | 660 | 600 | 600 | 180 |
| Vol % diamond in material | 35 | 11 | 53 | 78 |
| Third phase | none | none | none | none |
| Vol % of third phase in material | | | | |
| Result - Size (μm) | 200–1000 | 200–600 | 150–300 | 200–800 |

| Example | 51 | 52 | 53 | 54 |
|---|---|---|---|---|
| Diamond source type | synthetic | natural | synthetic | synthetic |
| Source size (μm) | 0–0.5 | 0–0.5 | 0.5–1.0 | 1.0–2.0 |
| Seed type | synthetic diamond | none | none | synthetic diamond |
| Seed size (μm) | 65–75 | | | 65–75 |
| Pressure (kbar) | 53.0 | 54.2 | 54.2 | 54.2 |
| Temperature (° C.) | 1370 | 1390 | 1390 | 1370 |
| Time (mins) | 660 | 180 | 180 | 600 |
| Vol % diamond in material | 8 | 15 | 31 | 16 |
| Third phase | eutectic tungsten carbide mixture | tungsten carbide | tungsten carbide with 7.37% cobalt | silicon carbide |
| Vol % of third phase in material | 30 | 30 | 10 | 26 |
| Result - Size (μm) | up to 200 | 30–60 | up to 15 | 10–20 |

EXAMPLE 55

In another example, a reaction capsule was used to produce a material comprising twinned diamond crystals and chromium carbide fibres dispersed in a matrix of nickel/phosphorus containing a small quantity of chromium. The chromium carbide fibres were formed in situ by the chemical reaction of chromium metal in the matrix and carbon in solution from the diamond. A mixture was made of (a) 70 volume percent nickel/chromium/phosphorus alloy powder, and (b) 30 volume percent diamond powder with a size range less than 0.25 microns. The mixture was shaped into a cylinder, containing about 20% porosity, by hot pressing. The cylinder was placed in the reaction capsule and raised to conditions of about 54.2 kbars and about 1420° C., and the conditions maintained for a period of about 11 hours. The piece that was recovered from the capsule remained cylindrical in shape, and its dimensions had been reduced in proportion to the reduction in porosity. Upon examination of the recovered material, fibres of chromium carbide, of approximately hexagonal cross section and with a length of up to 500 microns and about 30 microns across, were found dispersed amongst the grown diamonds. These diamonds were twinned and ranged in size from about 100 to 750 microns.

What is claimed is:

1. A method of making a bonded coherent material comprising a mass of diamond crystals in a matrix, comprising providing a source of diamond crystals, providing a plurality of growth centers defined by diamond crystals, producing a reaction mass by bringing the source and growth centers into contact with a solvent/catalyst, subjecting the reaction mass to conditions of elevated temperature and pressure suitable for crystal growth in a reaction zone of a high temperature/high pressure apparatus to produce the material and removing the material from the reaction zone, wherein supersaturation of carbon in the solvent/catalyst is achieved, and is achieved predominantly by a selection of particle size difference between the source crystal and the growth centers,
   wherein the content of source and growth centers diamond, together, in the reaction mass is less than 80 percent by volume, and
   wherein the mass of diamond crystals in the bonded, coherent material contains at least 40 percent of synthetic twinned diamonds.

2. A method according to claim 1 wherein the source crystals and growth centres are provided by particles at opposite ends of a particle size range of 0.5–75 μm.

3. A method according to claim 1 wherein the growth centres are provided by seed crystals.

4. A method according to claim 1 wherein the quantity of source crystals is greater than that of the growth centres.

5. A method according to claim 1 wherein the reaction mass is created by mixing the source and growth centre diamond with solvent/catalyst in particulate form.

6. A method according to claim 1 wherein the content of source and growth centre diamond, together, in the reaction mass is at least 10 percent by volume.

7. A method according to claim 1 wherein the reaction mass contains another phase.

8. A method according to claim 7 wherein the other phase is in the form of particles, fibres, whiskers, platelets or the like.

9. A method according to claim 7 wherein the other phase is a carbide, oxide, nitride, silicide, boride or mixture thereof.

10. A method according to claim 7 wherein the other phase is a cemented carbide.

11. A method according to claim 7 wherein the other phase is mixed with the diamond source material and growth centre material and solvent/catalyst to create the reaction mass.

12. A method according to claim 7 wherein the other phase is produced in situ in the reaction mass during the diamond growth.

13. A method according to claim 1 wherein the synthetic twinned diamonds include contact twins, macle twins, polysynthetic twins and star twins.

14. A method according to claim 1 wherein the synthetic twinned diamonds include diamonds having a blocky or cube shape, plate shape or column shape.

Figure 2:
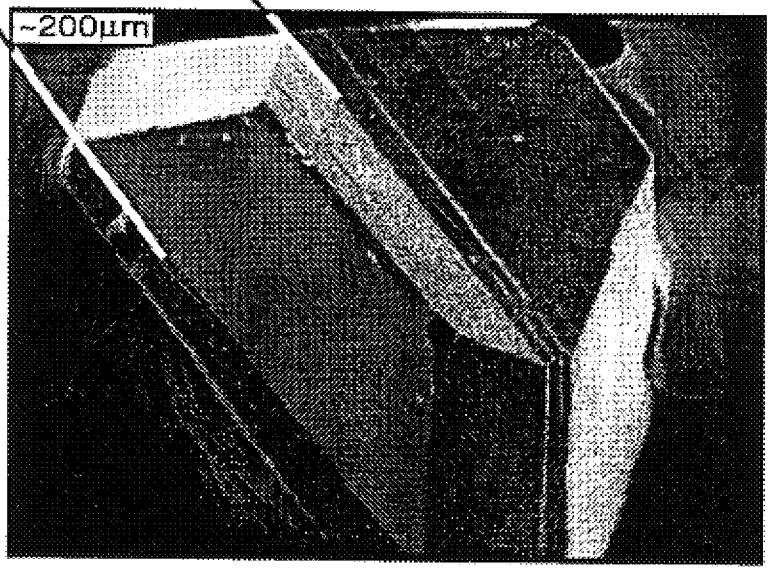
Figure 3:
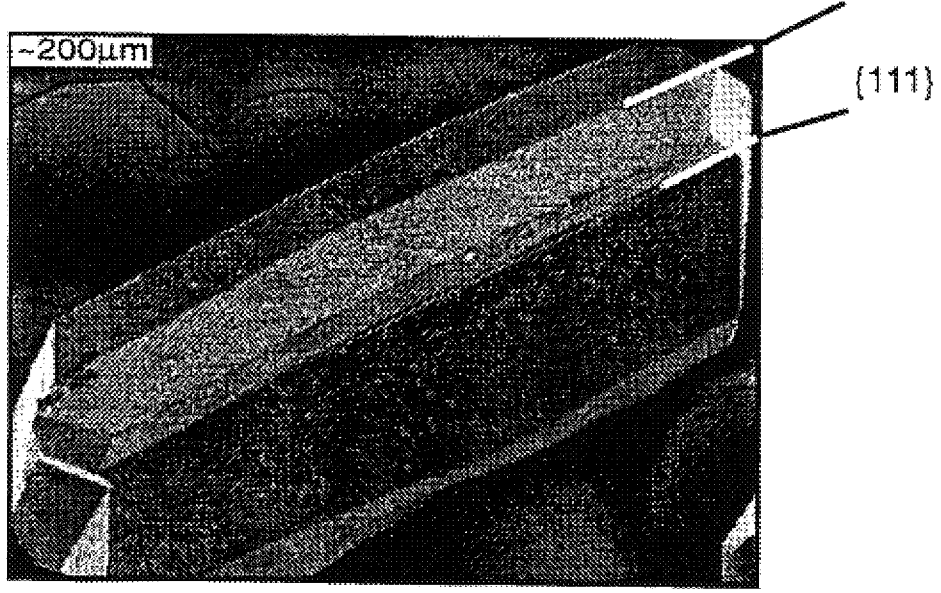
Figure 4:
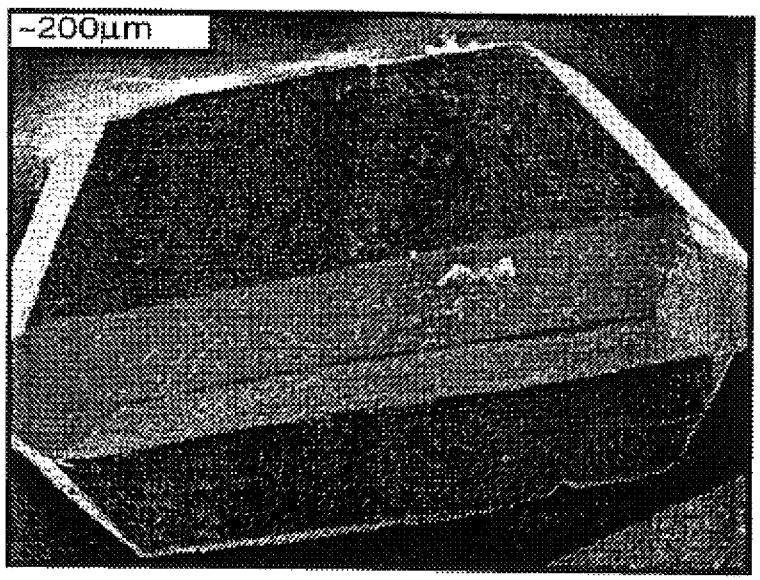
Figure 5:
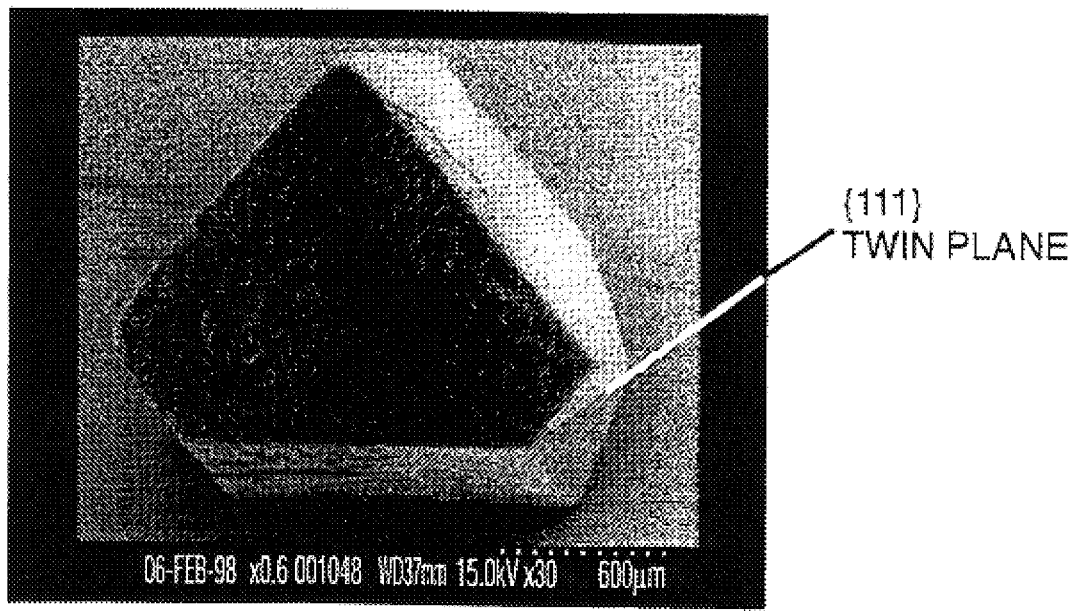
Figure 6:
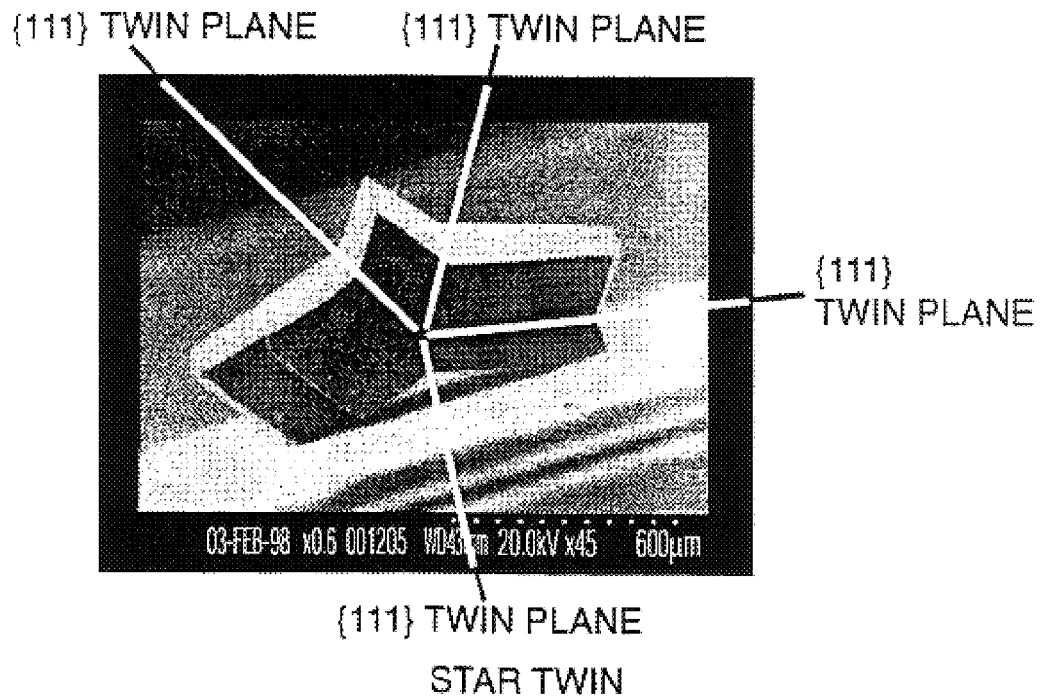
Figure 7:
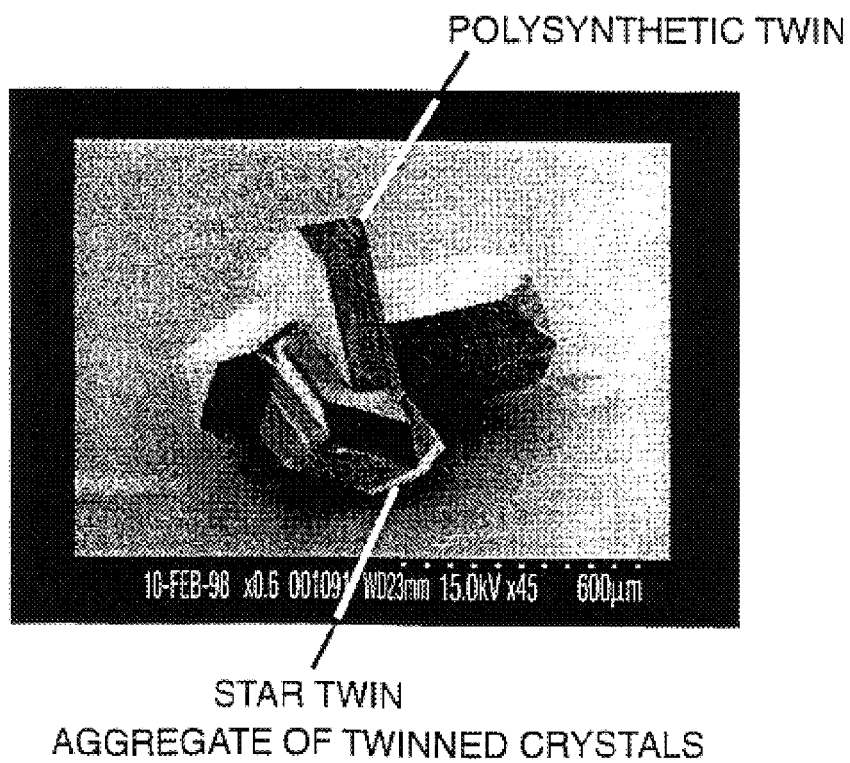
Figure 8:
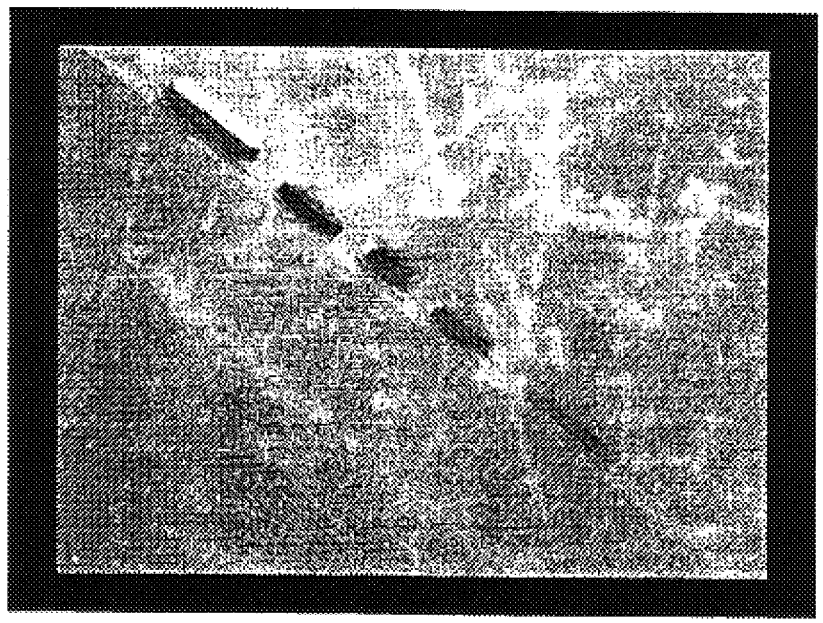
FIGS. 8 and 9 are photographs of synthetic macle twin plates from different angles. The high aspect ratio is to be noted.
Figure 9:
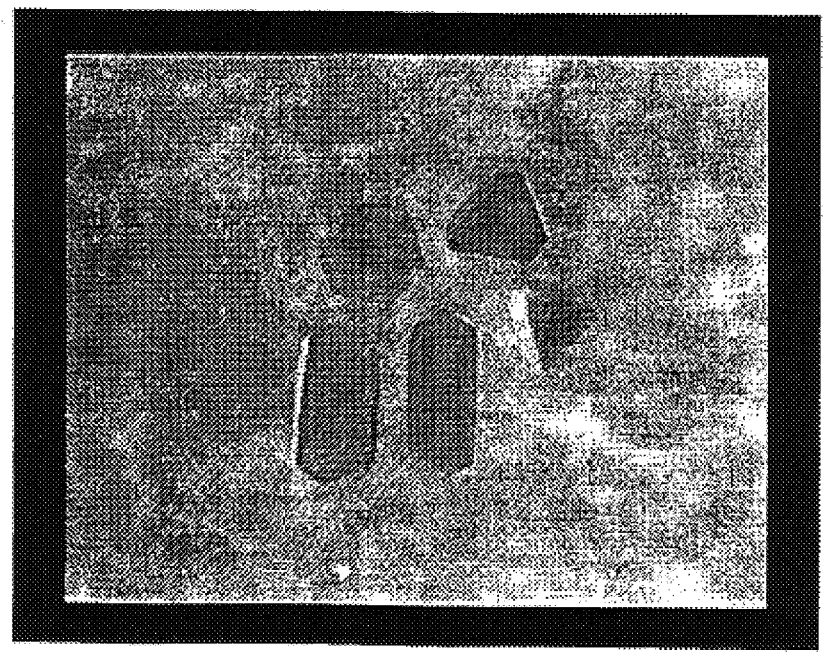
Figure 10:
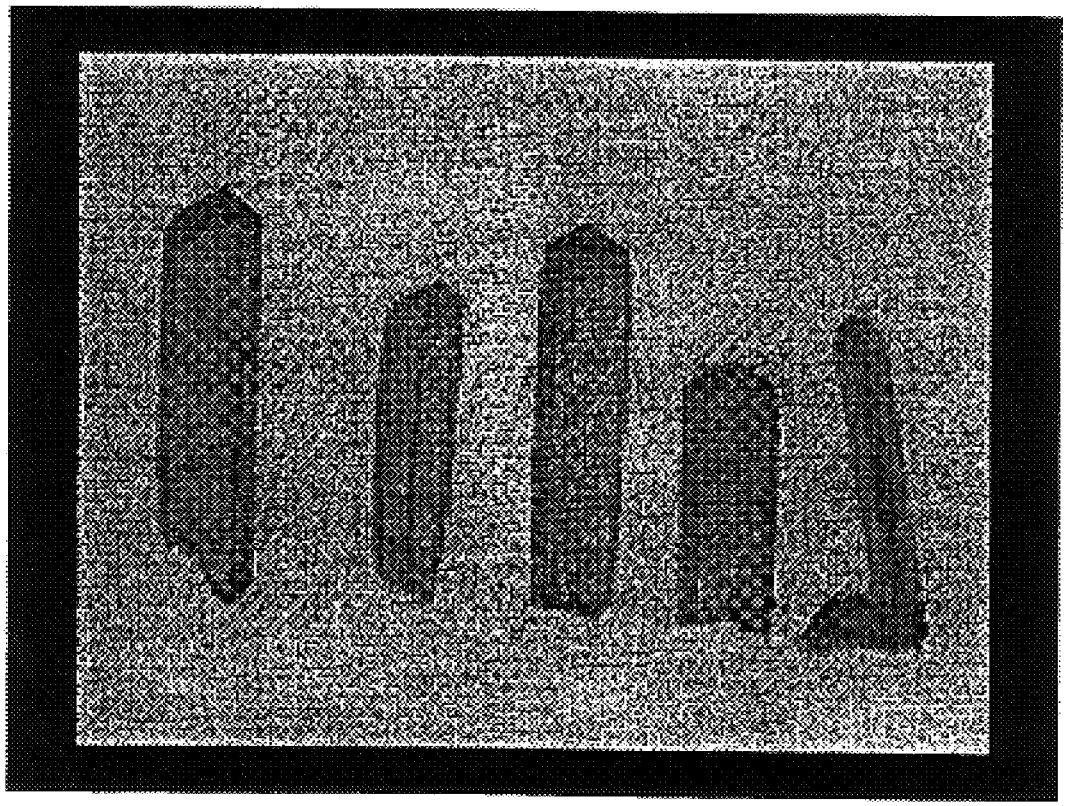
FIG. 10 is a photograph of an elongate star twin diamond crystal. Again, the high aspect ratio is to be noted.

15. A method according to claim 1 wherein the twinned diamonds include shapes substantially as illustrated in photographs of any one of FIGS. 1 to 10.

16. A method according to claim 1 wherein the elevated temperature and pressure conditions are those under which diamond is thermodynamically stable.

17. A method according to claim 1 wherein the elevated temperature is in the range 1200 to 1500° C. and the elevated pressure is in the range 50 to 70 kilobars (5 to 7 GPa).

18. A bonded, coherent material comprising a mass of diamond crystals in a matrix containing a solvent/catalyst characterised in that the diamond mass contains at least 40 percent synthetic twinned diamonds.

19. A material according to claim 18 wherein substantially the entire diamond mass consists of synthetic twinned diamonds.

20. A material according to claim 18 wherein the diamond content of the material is less than 80 percent.

21. A material according to claim 18 wherein the matrix contains another phase.

22. A material according to claim 21 wherein the other phase is in the form of particles, fibres, whiskers, platelets or the like.

23. A material according to claim 21 wherein the other phase is a carbide, oxide, nitride, silicide, boride or mixture thereof.

24. A material according to claim 21 wherein the other phase is a cemented carbide.

25. A material according to claim 18 wherein the synthetic twinned diamonds include contact twins, malce twins, polysynthetic twins and star twins.

26. A material according to claim 18 wherein the synthetic twinned diamonds include diamonds having a blocky or cube shape, plate shape or column shape.

27. A material according to claim 18 wherein the twinned diamonds include shapes substantially as illustrated in photographs of any one of FIGS. 1 to 10.

* * * * *